(No Model.)  3 Sheets—Sheet 1.

H. H. STODDARD.
POULTRY BROODER.

No. 574,767. Patented Jan. 5, 1897.

WITNESSES:

INVENTOR
H. H. Stoddard
BY
ATTORNEYS.

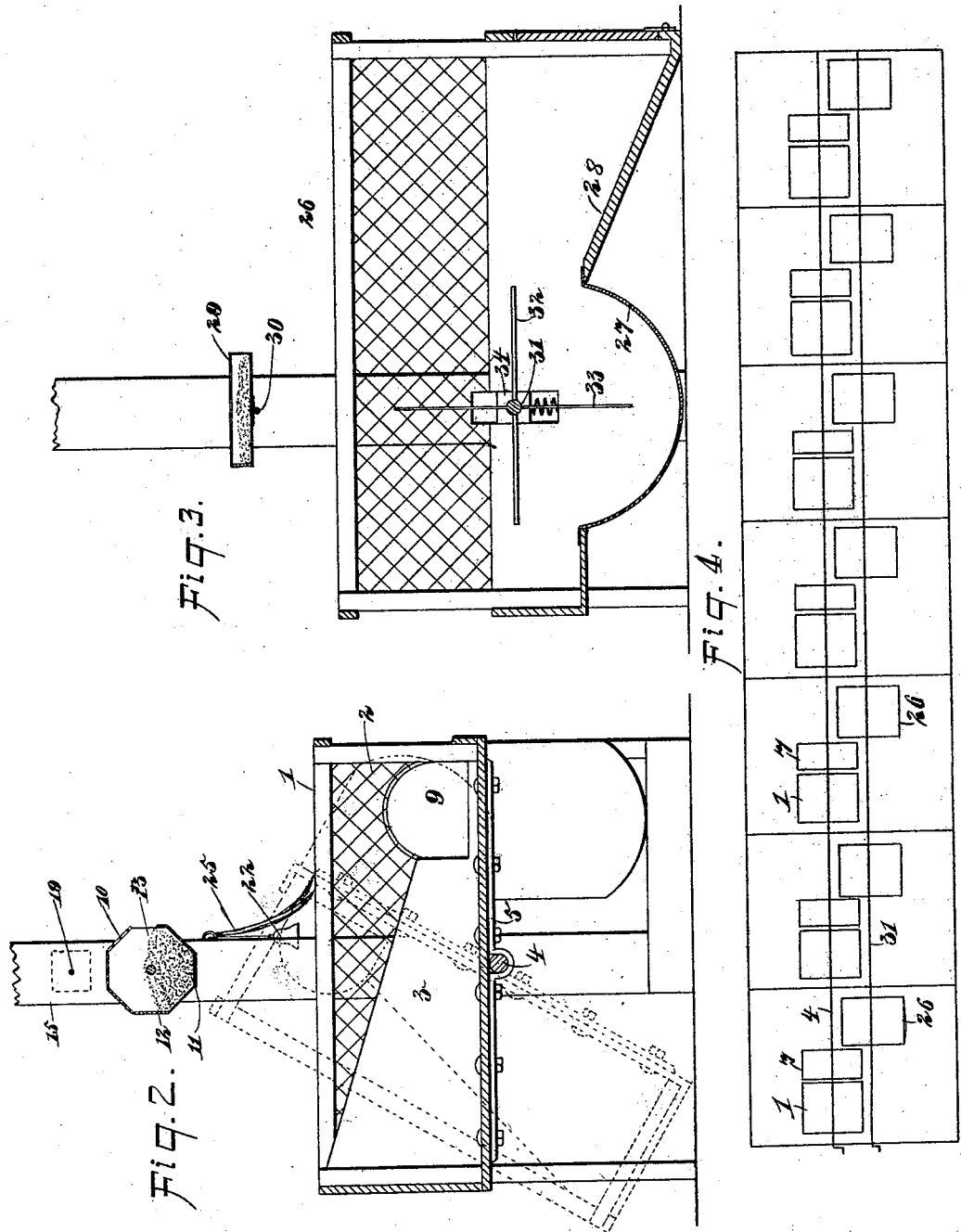

(No Model.) 3 Sheets—Sheet 3.

H. H. STODDARD.
POULTRY BROODER.

No. 574,767. Patented Jan. 5, 1897.

WITNESSES:

INVENTOR
H. H. Stoddard
BY
ATTORNEYS.

UNITED STATES PATENT OFFICE.

HIRAM H. STODDARD, OF KEARNEY, NEBRASKA.

POULTRY-BROODER.

SPECIFICATION forming part of Letters Patent No. 574,767, dated January 5, 1897.

Application filed June 16, 1896. Serial No. 595,723. (No model.)

*To all whom it may concern:*

Be it known that I, HIRAM H. STODDARD, of Kearney, in the county of Buffalo and State of Nebraska, have invented new and useful Improvements in Poultry-Brooders and Feed-Mixers, of which the following is a full, clear, and exact description.

This invention relates to devices for confining and rearing young chickens; and the object is to provide a device in which the chickens are compelled or induced to take a certain amount of exercise, which is very necessary to give strength and hardihood to the chickens. The device is also adapted to securing exercise for adult fowls that are confined in yards or buildings, especially breeding-stock, causing their eggs to be fertile and productive of vigorous chickens.

The invention comprises a coop in which a certain amount of hay, chopped straw, chaff, or forest-leaves may be agitated to thoroughly mix the food in the shape of cereals with said hay, straw, &c., and thus compel the chickens or grown fowls to scratch to obtain the food, and thus obtain the necessary amount of exercise.

I will describe a device embodying my invention and then point out the novel features in the appended claims.

Reference is to be had to the accompanying drawings, forming a part of this specification, in which similar characters of reference indicate corresponding parts in all the views.

Figure 1:
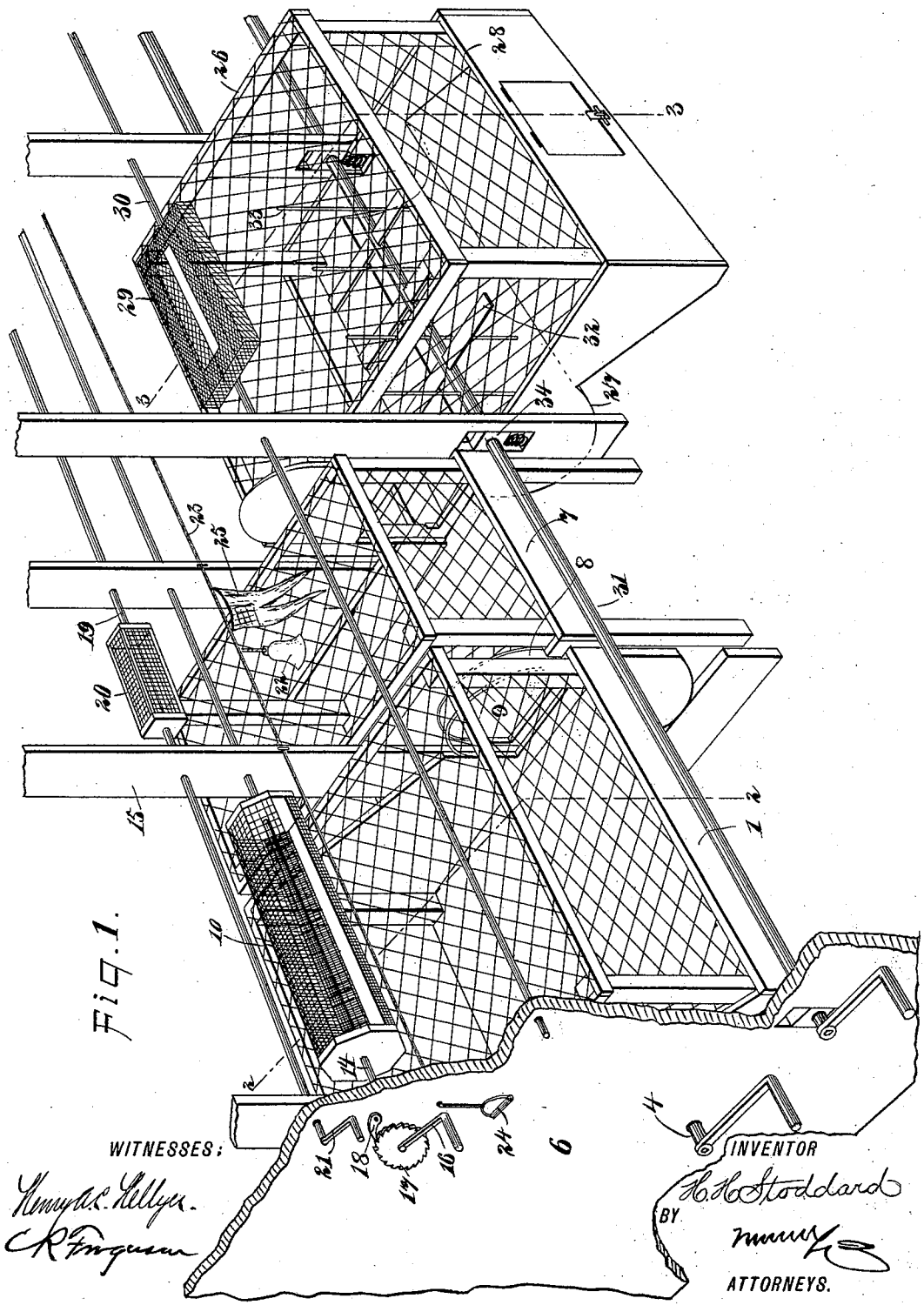
Figure 5:
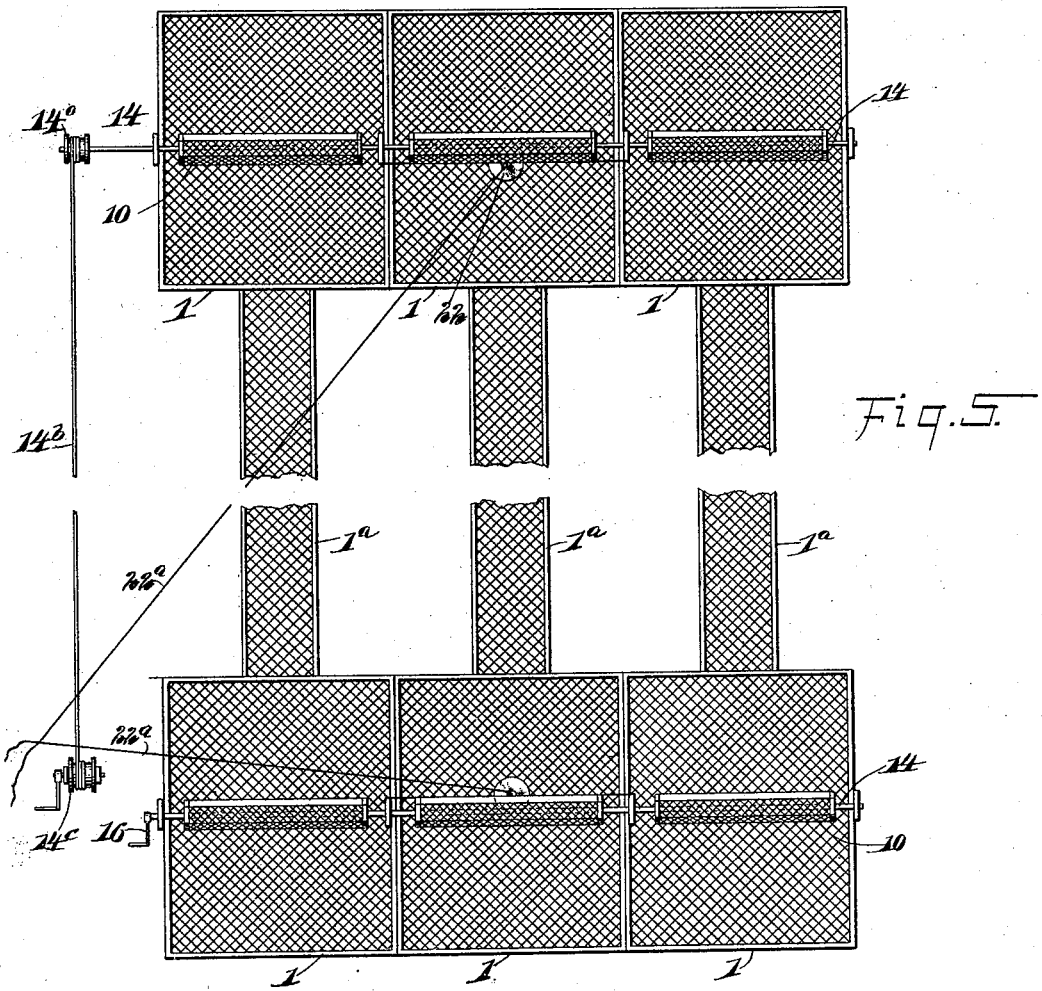

Figure 1 is a perspective view of a device embodying my invention. Fig. 2 is a transverse section substantially on the line 2 2 of Fig. 1. Fig. 3 is a section substantially on the line 3 3 of Fig. 1. Fig. 4 is a plan view showing a series of the devices as connected, and Fig. 5 is a plan view showing a modification in which there are several feeding boxes or coops arranged at a considerable distance apart.

Referring to the drawings, 1 designates a main feeding-box having its front, top, and a portion of its sides inclosed by a suitable wire-netting 2. Its bottom and rear side, however, are closed, and its ends are partially closed by means of boards 3, which extend from the rear side toward the front side, the upper edges of said end boards 3 being inclined downward and forward. This box 1 is mounted on a shaft 4, the said shaft being here shown as secured to the under side of the box by means of metal strips 5, and this shaft has bearings in suitable end walls or uprights 6.

Adjacent to the box 1 is a coop 7, which is rigidly fixed in position and has an opening 8, adapted to commuicate with an opening 9 in the adjacent end wall of the box 1. Above the box 1 is a feed-distributer 10, adapted to be oscillated in a rotary direction to discharge granulated food in small quantities into the box 1 to be mixed with hay, straw, or other material that may be placed in said box 1, as will be hereinafter described. This feed-distributer 10, as here shown, is octagonal in form; but I do not wish to be confined to any particular shape, as it is obvious that other angles may be employed or that the distributer may be made circular.

On one of its sides the feeder 10 is provided with a closed metal strip 11, and its other sides are covered by screen material 12, gradually increasing in the size of the mesh. A portion 13, however, of the feeder is left open, so that the feeding material may be placed therein. The feeder 10 is mounted on a shaft 14, having bearings through the end walls 6 and suitable uprights 15, and at one end this shaft 14 is provided with a crank 16 and a ratchet-wheel 17, adapted to be engaged by a pawl 18 to prevent a backward movement of said feeder.

The object in forming the feeding-box 10 with screen material having different sizes of mesh is to allow granulated food or cereals of different sizes that may be placed therein to be discharged independently, that is, when the feed-box is rotated the smallest seed or cereal will escape through the finer mesh, which is next to the closed bottom 11 and therefore first brought into operation, and then of course as the next sieve portion having a greater mesh is brought to the bottom plane the cereal of the next large size will be discharged, and this will continue until a small portion of each of the cereals has been discharged into the feeding-box. It is to be understood that very small portions of feed are to be deposited or discharged into the feeding-box at one operation, as the operation may be repeated as many times a day as is deemed necessary.

Mounted on a shaft 19 is a feed-distributer 20, having its sides formed of a suitable screen material of mesh of assorted sizes and one closed side and adapted to discharge the feed into the stationary or fixed box 7 at a certain time. This shaft 19 is provided with a suitable crank 21, by means of which it may be rotated or oscillated.

Arranged above the fixed box 7 is a chicken-calling device, here shown in the form of a bell 22, attached to a wire or cord 23, movable through suitable guideways on the uprights 15 and having an end extended through the end board or upright 6, where it is provided with a handle 24, and also mounted on this string or wire 23 is a small flag 25, adapted by its sight to attract the attention of the chickens when it is desired to transfer them from the box 1 to the box or coop 7.

In the operation of this part of my invention the chickens may be feeding in the box 1. When it is desired to supply some grain to the hay, cut straw, chaff, or other material that may be in the box 1, the chickens are to be called into the fixed box or coop 7. Therefore by pulling the wire or cord 23 the bell 22 will be sounded and aurally attract the attention of the chickens, and the flag 25 will be fluttered to further attract their attention. Then on depositing a small amount of food from the feed-receptacle 20 into the box 7 the chickens will all run into said fixed box 7. After the chickens shall have left the box 1 the feed-receptacle 10 is to be slightly oscillated to deposit a small amount of cereal in the material in the box 1, and then this box 1 is to be tilted back and forth by oscillating the shaft 4, which will cause the cereal to mix with the material in the box, after which, the openings 8 and 9 being in communication, the chickens may return to the main feeding-box 1.

Adjacent to the fixed box 7 is a coop or box 26, having its vertical walls and top wall formed of suitable screen material and having its bottom formed of a concaved portion 27, communicating with a downwardly-inclined feeding-floor 28. A feed-box 29 of perforated material is placed on a shaft 30, adapted to reciprocate longitudinally over the box 26. This feed-box 29, as here shown, is located directly over the concaved portion 27 within the box, which is designed to receive chaff, cut straw, leaves, or similar material with which the feed is to be mixed. A shaft 31 extends through the box 26 and has mounted on it radial arms or sweepers 32 33, which may be of any suitable material, such, for instance, as metal, rattan, or other brush material. The shaft 31 preferably has bearings through boxes 34, movable vertically in suitable guideways formed in the end walls of the box 26, so that the said shaft carrying the brush or agitator may automatically move downward to engage in the chaff contained in the concave bottom 27. This box 26 is designed particularly for chickens that are too young to be placed in the boxes 1 and 7 or to be attracted by the calling devices arranged over the box 7, and is also adapted to adult fowls that have not been occupants of 1 and 7 long enough to have learned the meaning of the calling devices. In the operation of this box 26 a suitable amount of feed material will be discharged from the feed-receptacle 29, and then by rotating the shaft 31 the said feed will be mixed to a certain extent with the material in the concave portion 27, and a certain amount of this mixed material will be carried over and deposited upon the inclined floor 28, where the young chickens or grown fowls will be compelled to scratch over the material to obtain the food. Of course the shaft 31 must be rotated very slowly, so as not to frighten the occupants of the box.

There may be any desired number of feeding-boxes arranged on one shaft 4, and also the required number of feeding-receptacles 10 may be mounted on the shaft 14, and the several parts operated together, as indicated in Fig. 4.

It is obvious that the several shafts may be operated manually or that they may be operated automatically by suitable machinery which it is not deemed necessary to show herein, and it is further obvious that the device embodying this invention will prove of great utility as a labor-saving device, as heretofore it has been customary to mix the cereals or food material with the cut straw, hay, or other material by means of a fork.

Referring now to the device shown in Fig. 5, it will be seen that two series of feed-boxes or coops 1 are arranged at a long distance apart, and opposite feed-boxes are connected by runways $1^a$, which of course may be provided at the sides and top with a suitable screen or netting. These runways may be several hundred feet long, and the object is to provide exercise for the body and wings of chickens or fowls as they race through these narrow runways upon being called or attracted by the alarms 22. These several feed-boxes are provided with feed-mixers 10, mounted on shafts, as in the first example of my improvement, and it is desired that an attendant may operate the feed-mixers at the distant boxes from what may be termed the "home station" or feed-box, thus obviating a long walk on the part of the attendant. For this purpose I provide the shaft 14 of the distant feed-distributer with a pulley $14^a$, from which an endless band $14^b$ extends to a pulley $14^c$, located close to the home series of feed-boxes. The shaft of this pulley $14^c$ is provided with a suitable crank by which the pulley may be turned back and forth. The alarm or calling devices 22 for both series of feed-boxes have cords or wires $22^a$, extended to a point adjacent to the pulley $14^c$. It is obvious that the home box may be placed indoors, if desired, thus providing protection for the chickens or fowls in inclement weather.

In this Fig. 5 I have not deemed it necessary to show the boxes 7, as it is obvious that these boxes may be omitted or added without departing from the spirit of my invention.

Having thus described my invention, I claim as new and desire to secure by Letters Patent—

1. A poultry-brooder and feed-mixer, comprising a tilting feed-box, a feed-receptacle for discharging feed into said box, a fixed box or coop adjacent to the feed-box and communicating therewith, and a chicken-call located over the said fixed box, substantially as specified.

2. A poultry-brooder and feed-mixer, comprising a tilting feed-box, a fixed box arranged adjacent thereto and having communication therewith, and a feed-distributer located over said fixed box, substantially as specified.

3. A poultry-brooder and feed-mixer, comprising a tilting box, a feed-distributer located over the same, a fixed box arranged adjacent to the tilting box and having communication therewith, a chicken-call arranged above the fixed box, and a feed-distributer arranged above said fixed box, substantially as specified.

4. A poultry-brooder and feed-mixer, comprising a series of feed-boxes, an oscillating or rocking shaft on which said boxes are mounted, a series of feed-receptacles arranged above the feed-boxes and respectively communicating with the feed-boxes and all mounted on a shaft, and fixed boxes arranged between the tilting boxes, substantially as specified.

5. A poultry-brooder and feed-mixer, comprising a box having an inclined floor portion and a concaved portion, a rotary shaft extending through said box, arms or sweepers mounted on said shaft and adapted to turn within the concave portion of the bottom, and a feed-distributer arranged above said box, substantially as specified.

6. The combination, with a tilting box and a fixed box adjacent thereto, of a feeding-box having a concave floor portion and an inclined floor portion, and a mixer operating in said concave portion, substantially as specified.

7. A poultry-brooder and feed-mixer having a series of feed-boxes, a rock-shaft on which said boxes are fixed stationary boxes arranged between the feed-boxes and respectively communicating with the feed-boxes and means for mixing the food within the feed-boxes, substantially as described.

8. A poultry-brooder and feed-mixer having a box with a floor a portion of which is inclined and a second portion of which is concaved, the two said portions being contiguous to each other, a rotary shaft adjacent to the concaved portion, and arms or sweepers carried by the shaft and moving through the said concaved portion, substantially as described.

HIRAM H. STODDARD.

Witnesses:
CHAS. REILLY,
JOHN W. BREWSTER.